United States Patent
Chang et al.

(10) Patent No.: US 11,862,842 B2
(45) Date of Patent: Jan. 2, 2024

(54) ANTENNA MODULE AND DISPLAY APPARATUS

(71) Applicant: Au Optronics Corporation, Hsinchu (TW)

(72) Inventors: Chen-Yi Chang, Hsinchu (TW); Chao-Wei Yeh, Hsinchu (TW); Yu-Ling Yeh, Hsinchu (TW); Pei-Heng Li, Hsinchu (TW); Chao-Yang Chou, Hsinchu (TW); Hsi-Tseng Chou, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/838,290

(22) Filed: Jun. 13, 2022

(65) Prior Publication Data
US 2023/0223674 A1    Jul. 13, 2023

(30) Foreign Application Priority Data
Jan. 12, 2022 (TW) .................................. 111101261

(51) Int. Cl.
| | | |
|---|---|---|
| *H01Q 1/22* | (2006.01) | |
| *H01Q 1/38* | (2006.01) | |
| *H01Q 9/04* | (2006.01) | |
| *G06F 1/16* | (2006.01) | |
| *H01Q 1/14* | (2006.01) | |

(52) U.S. Cl.
CPC ......... *H01Q 1/2266* (2013.01); *G06F 1/1698* (2013.01); *H01Q 1/14* (2013.01)

(58) Field of Classification Search
CPC ............ H01Q 1/14; H01Q 1/22; H01Q 1/226; H01Q 1/24; H01Q 1/242; H01Q 1/38; H01Q 9/04; G06F 1/1613; G06F 1/1698; H04B 1/3827
See application file for complete search history.

(56) References Cited

U.S. PATENT DOCUMENTS

| | | | |
|---|---|---|---|
| 10,622,703 B2 | 4/2020 | Hong et al. | |
| 11,139,555 B2 | 10/2021 | Choi et al. | |
| 2016/0190678 A1 | 6/2016 | Hong et al. | |
| 2020/0227835 A1* | 7/2020 | Kim ..................... | H01Q 21/065 |
| 2020/0243959 A1* | 7/2020 | Ryu ........................ | H01Q 1/38 |

(Continued)

FOREIGN PATENT DOCUMENTS

| | | |
|---|---|---|
| CN | 105742797 | 7/2016 |
| CN | 111344900 | 6/2020 |

(Continued)

*Primary Examiner* — Blane J Jackson
(74) *Attorney, Agent, or Firm* — JCIPRNET

(57) ABSTRACT

Provided is a display apparatus including a display panel, multiple antenna electrodes, a dummy electrode, and multiple feed lines. The display panel has a display area. The antenna electrodes are disposed on the display panel and overlap the display area. The dummy electrode is disposed around the antenna electrodes and overlaps the display area. The dummy electrode is electrically separated from the antenna electrodes, and has multiple dummy wire segments whose extension directions intersect each other. The dummy wire segments have multiple breaks. The feed lines are respectively electrically connected to the antenna electrodes. An antenna module is also provided.

18 Claims, 12 Drawing Sheets

(56) References Cited

U.S. PATENT DOCUMENTS

| | | |
|---|---|---|
| 2021/0083387 A1 | 3/2021 | Oh et al. |
| 2021/0141426 A1* | 5/2021 | Kim .......................... H01Q 1/38 |
| 2022/0037765 A1* | 2/2022 | Lee ...................... H01Q 9/0407 |
| 2022/0216596 A1* | 7/2022 | Ryu .......................... H01Q 1/38 |
| 2022/0247083 A1* | 8/2022 | Kim .................. H01Q 21/0075 |
| 2022/0278445 A1* | 9/2022 | Woo ....................... H01Q 21/08 |
| 2023/0062683 A1* | 3/2023 | Take ...................... H05K 3/303 |

FOREIGN PATENT DOCUMENTS

| | | | | |
|---|---|---|---|---|
| CN | 111834741 | | 10/2020 | |
| WO | WO-2016098763 A1 * | 6/2016 | ............. | H01Q 1/243 |
| WO | WO-2021147945 A1 * | 7/2021 | ....... | G02F 1/133305 |

\* cited by examiner

ANTENNA MODULE AND DISPLAY APPARATUS

CROSS-REFERENCE TO RELATED APPLICATION

This application claims the priority benefit of Taiwan application serial no. 111101261, filed on Jan. 12, 2022. The entirety of the above-mentioned patent application is hereby incorporated by reference herein and made a part of this specification.

BACKGROUND

Technical Field

The disclosure relates to an electronic apparatus integrating communication and display functions, and more particularly to an antenna module and a display apparatus.

Description of Related Art

As fifth-generation (5G) mobile communication technologies have been put into commercial use, relevant applications such as telehealth, VR live broadcast, 4K quality live broadcast, and smart home have new development opportunities. Supported by the high data rate, reduced latency, saved energy consumption, reduced cost, improved system capacity, and large-scale apparatus connection of the 5G technologies, operators in different fields may form cross-border alliances to jointly build a new 5G ecological chain. In particular, mobile apparatuses (such as smart phones or tablet computers) with built-in 5G communication modules have more application possibilities due to their high-speed networking capabilities.

In order to increase the flexibility of transmitting and receiving electromagnetic wave signals, most mobile apparatuses with 5G communication capabilities are usually disposed with multiple antenna modules on different mechanical surfaces, but this limits the space for placing other elements (such as GPS antennas, Bluetooth antennas, or WiFi antennas) or modules (NFC and wireless charging modules). Therefore, an idea of providing mesh type 5G antennas in a display area is proposed, and a dummy metal mesh pattern is usually provided around the display area to reduce the visibility of the antennas in the display area. However, this metal mesh pattern of antenna electrodes will obviously reduce the radiation efficiency of radiated electromagnetic waves.

SUMMARY

The disclosure provides a display apparatus with antenna electrodes disposed in a display area, and the antenna electrodes have better radiation efficiency of electromagnetic waves.

The disclosure provides an antenna module with better concealment of the antenna electrodes.

The display apparatus of the disclosure includes a display panel, multiple antenna electrodes, a dummy electrode, and multiple feed lines. The display panel has a display area. The antenna electrodes are disposed on the display panel and overlap the display area. The dummy electrode is disposed around the antenna electrodes and overlaps the display area. The dummy electrode is electrically separated from the antenna electrodes, and has multiple dummy wire segments whose extension directions intersect each other. The dummy wire segments have multiple breaks. The feed lines are respectively electrically connected to the antenna electrodes.

The antenna module of the disclosure includes a substrate, multiple antenna electrodes, multiple feed lines, and a dummy electrode. The antenna electrodes are disposed on a substrate, and each has multiple wire segments intersecting each other. Every two adjacent wire segments arranged along a first direction and parallel to each other have a first spacing, and each wire segment has a first linewidth. The feed lines are respectively electrically connected to the antenna electrodes. The dummy electrode is disposed around the antenna electrodes and is electrically separated from the antenna electrodes. The dummy electrode has multiple dummy wire segments whose extension directions intersect each other. Every two adjacent dummy wire segments arranged along the first direction and parallel to each other have a second spacing, and each dummy wire segment has a second linewidth. The first spacing is different from the second spacing, or the first linewidth is different from the second linewidth.

Based on the above, in the display apparatus of an embodiment of the disclosure, the dummy electrode disposed around the antenna electrodes has the dummy wire segments whose extension directions intersect each other and are at least partially disconnected. Therefore, the electrical coupling effect between the antenna electrodes and the dummy electrode may be effectively reduced, thereby improving the electromagnetic wave radiation efficiency of the antenna electrodes. In the antenna module of an embodiment of the disclosure, the visibility of the antenna electrodes may be effectively reduced by having different linewidths or arrangement spacings of the dummy wire segments of the dummy electrode and the wire segments of the antenna electrodes.

In order to make the aforementioned features and advantages of the disclosure comprehensible, embodiments accompanied with drawings are described in detail below.

DESCRIPTION OF THE EMBODIMENTS

Figure 1:
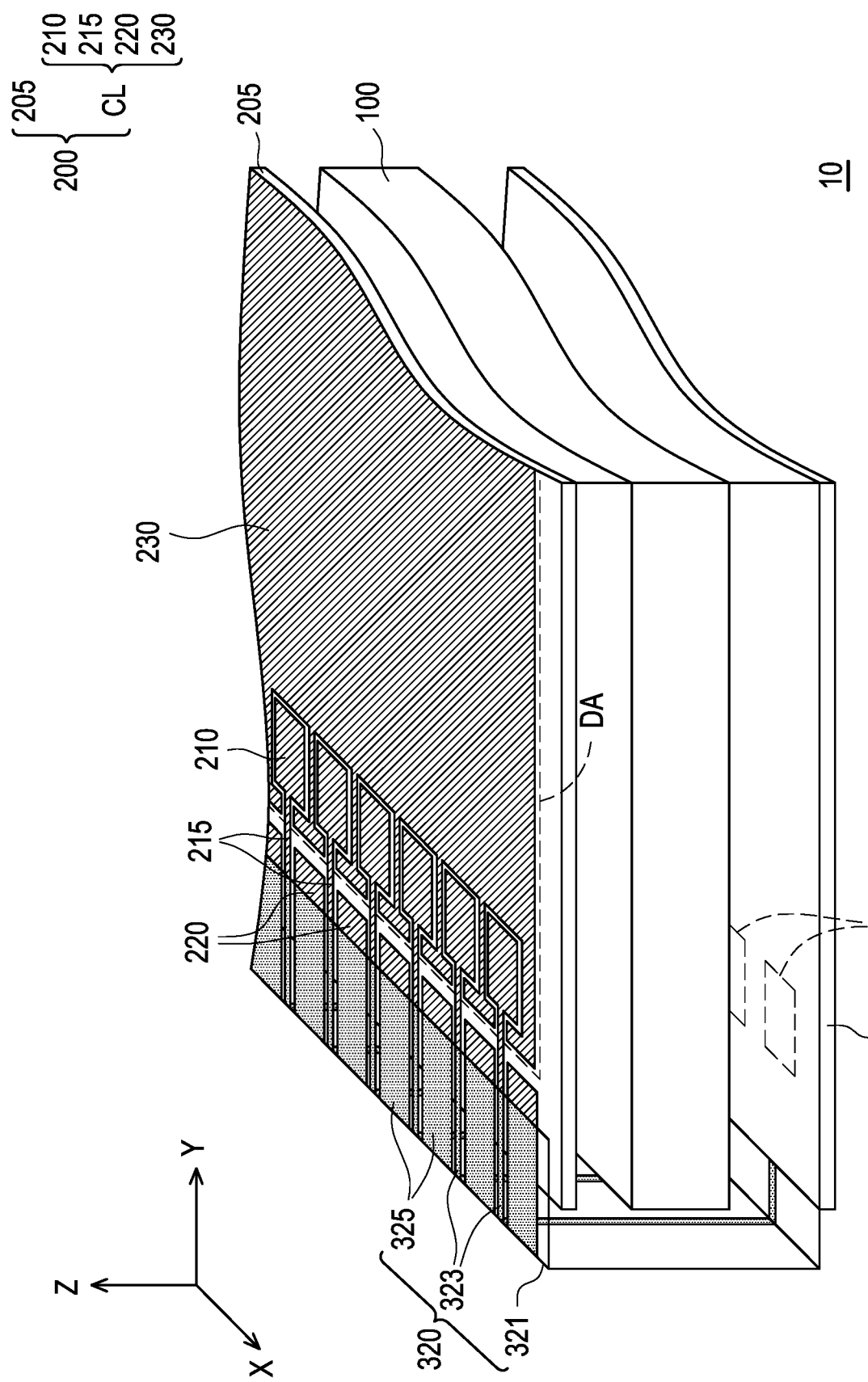
FIG. 1 is a schematic view of a display apparatus according to one embodiment of the disclosure.

The usages of "approximately," "similar to," "essentially," or "substantially" indicated throughout the specification include the indicated value and an average value having an acceptable deviation range, which is a certain value confirmed by people skilled in the art, and is a certain amount considered the discussed measurement and measurement-related deviation (i.e., the limitation of measurement system). For example, "approximately" may indicate to be within one or more standard deviations of the indicated value, such as being within ±30%, ±20%, ±15%, ±10%, or ±5%. Furthermore, the usages of "approximately," "similar to," "essentially," or "substantially" indicated throughout the specification may refer to a more acceptable deviation scope or standard deviation depending on measurement properties, cutting properties, or other properties, and all properties may not be applied with one standard deviation.

In the drawings, for clarity, the thickness of layers, films, plates, areas, and the like are magnified. It should be understood that when an element such as a layer, a film, an area, or a substrate is indicated to be "on" another element or "connected to" another element, it may be directly on another element or connected to another element, or an element in the middle may exist. In contrast, when an element is indicated to be "directly on another element" or "directly connected to" another element, an element in the middle does not exist. As used herein, "to connect" may indicate to physically and/or electrically connect. Furthermore, "electrically connected" may also be used when other elements exist between two elements.

Moreover, relative terms such as "below" or "bottom" and "above" or "top" may serve to describe the relation between one element and another element in the text according to the illustration of the drawings. It should also be understood that the relative terms are intended to include different orientations of a device in addition to the orientation shown in the drawings. For example, if a device in the accompanying drawings is flipped, an element described as being on the "lower" side of other elements shall be re-orientated to be on the "upper" side of other elements. Thus, the exemplary term "lower" may cover the orientations of "upper" and "lower," depending on the specific orientations of the accompanying drawings. Similarly, if a device in the accompanying drawings is flipped, an element described as being "below" other elements shall be re-orientated to be "above" other elements. Thus, the exemplary term "above" or "below" may cover the orientations of above and below.

Exemplary embodiments are described with cross-sectional views of schematic illustrations of ideal embodiments. Thus, shape alterations as a result of, for example, manufacturing techniques and/or tolerances can be expected, and the illustrated regions of the embodiments described herein should not be construed to particular shapes but include shape deviations due to, for example, manufacturing. For example, regions shown or described as being flat may generally have rough and/or non-linear features. Furthermore, the acute angles shown may be round. Therefore, the regions illustrated in the drawings are only schematic representations and are not intended to illustrate the exact shapes of the regions or to limit the scope of the claims.

References of the exemplary embodiments of the disclosure are to be made in detail. Examples of the exemplary embodiments are illustrated in the drawings. If applicable, the same reference numerals in the drawings and the descriptions indicate the same or similar parts.

Figure 2:
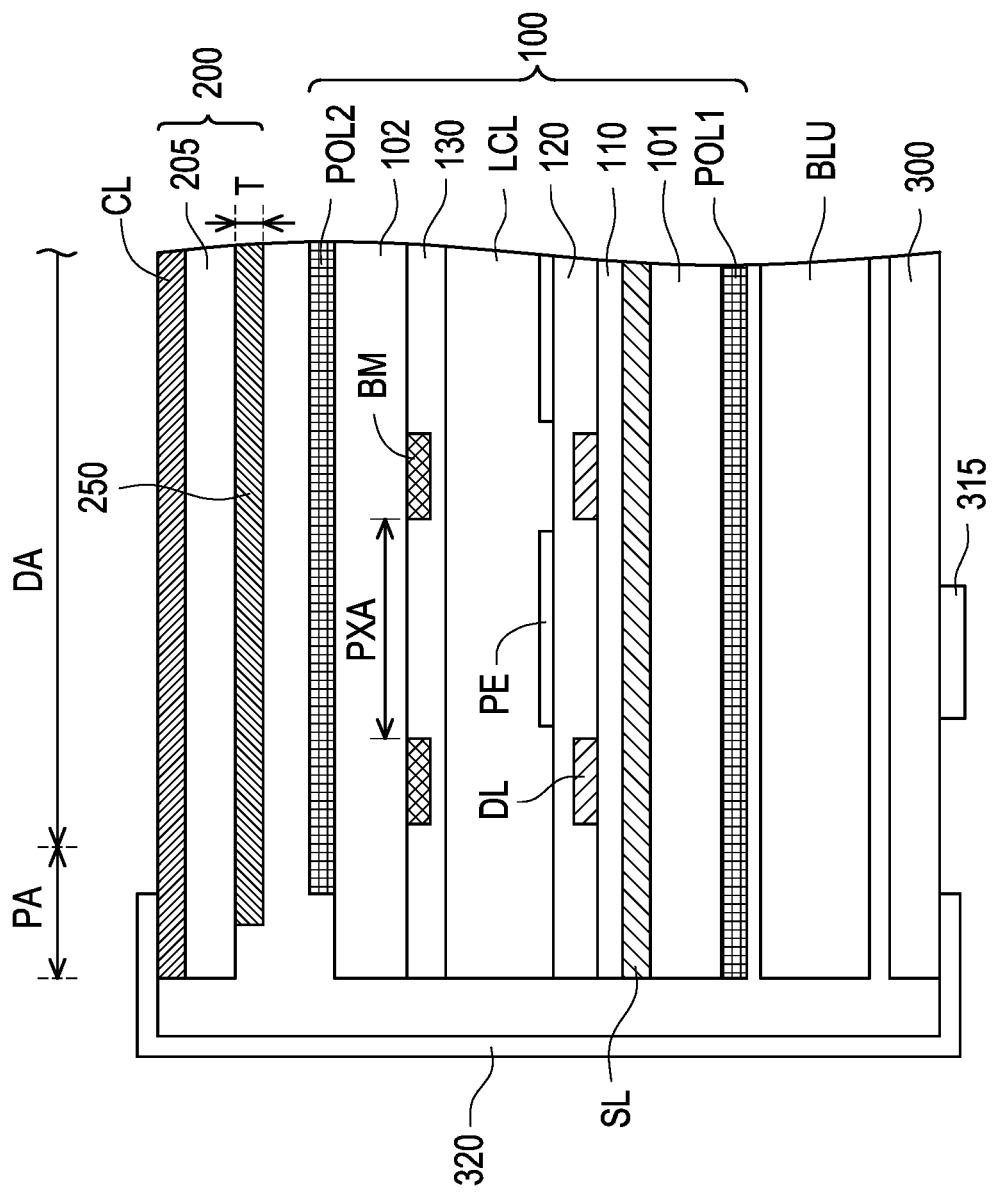
FIG. 2 is a schematic cross-sectional view of the display apparatus of FIG. 1.
Figure 3:
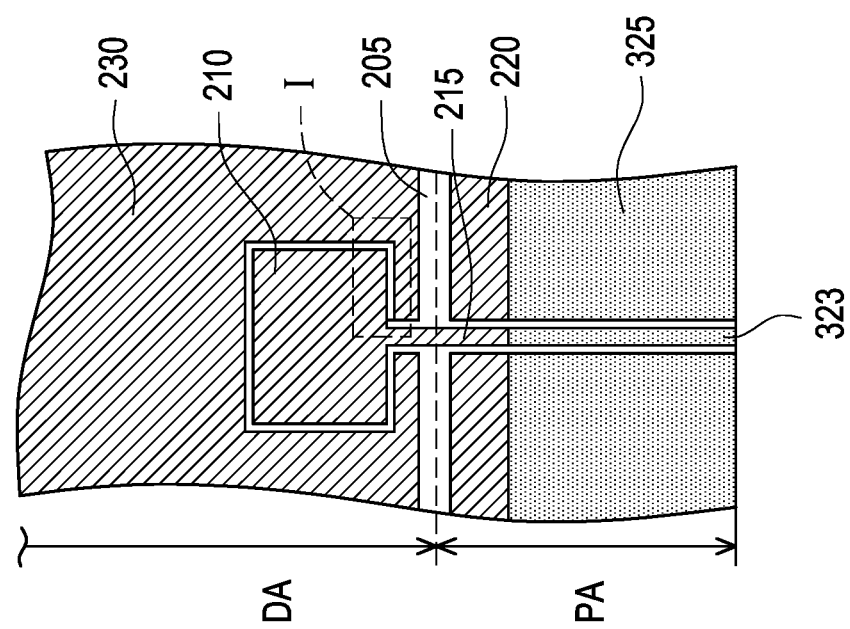
FIG. 3 is an enlarged top view of a partial area of the display apparatus of FIG. 1.
Figure 4:
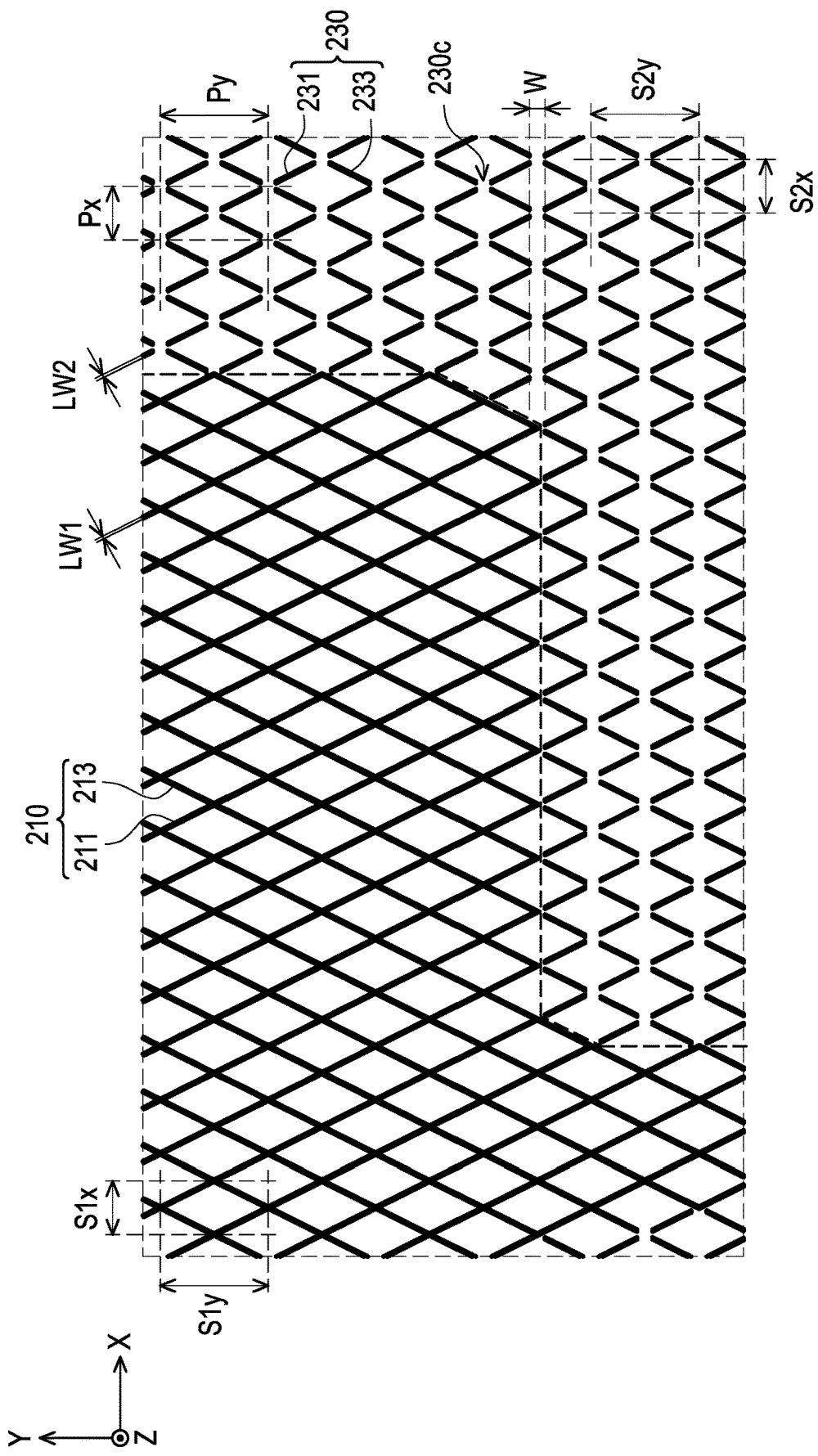
FIG. 4 is a partially enlarged schematic view of antenna electrodes and a dummy electrode of FIG. 3.
Figure 5:
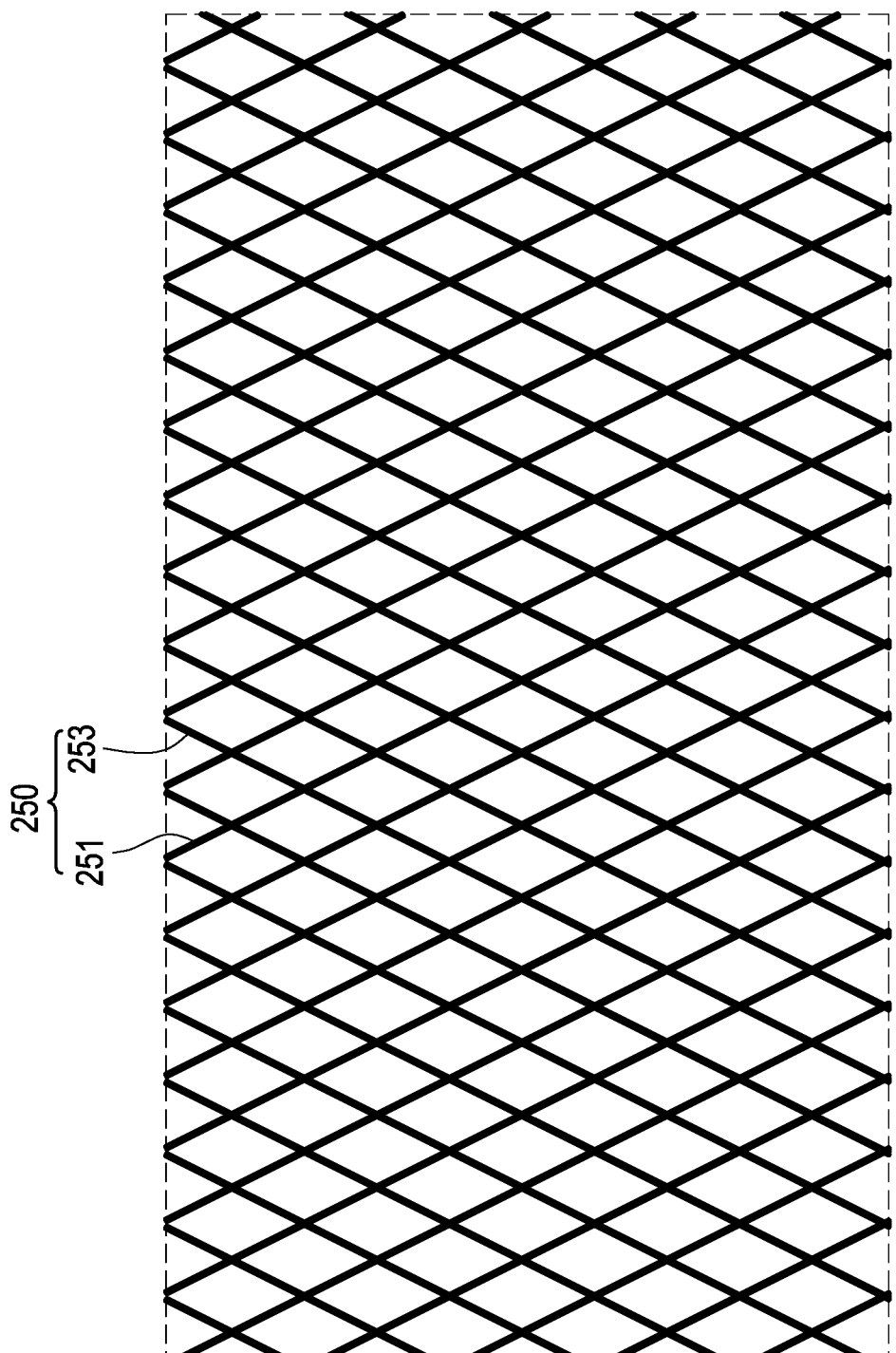
FIG. 5 is a schematic top view of a reflection layer of FIG. 2.
Figure 6:
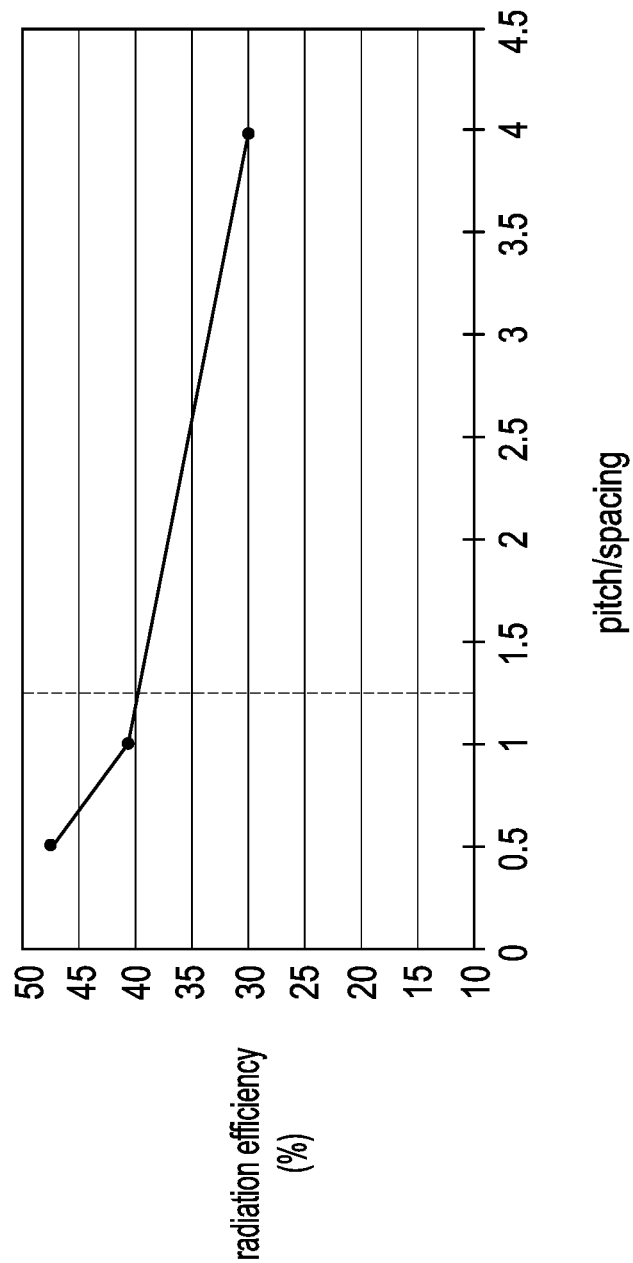
FIG. 6 is a line chart of the radiation efficiency of the antenna electrode of the disclosure to the pitch-spacing ratio of the dummy electrode in a direction.
Figure 7:
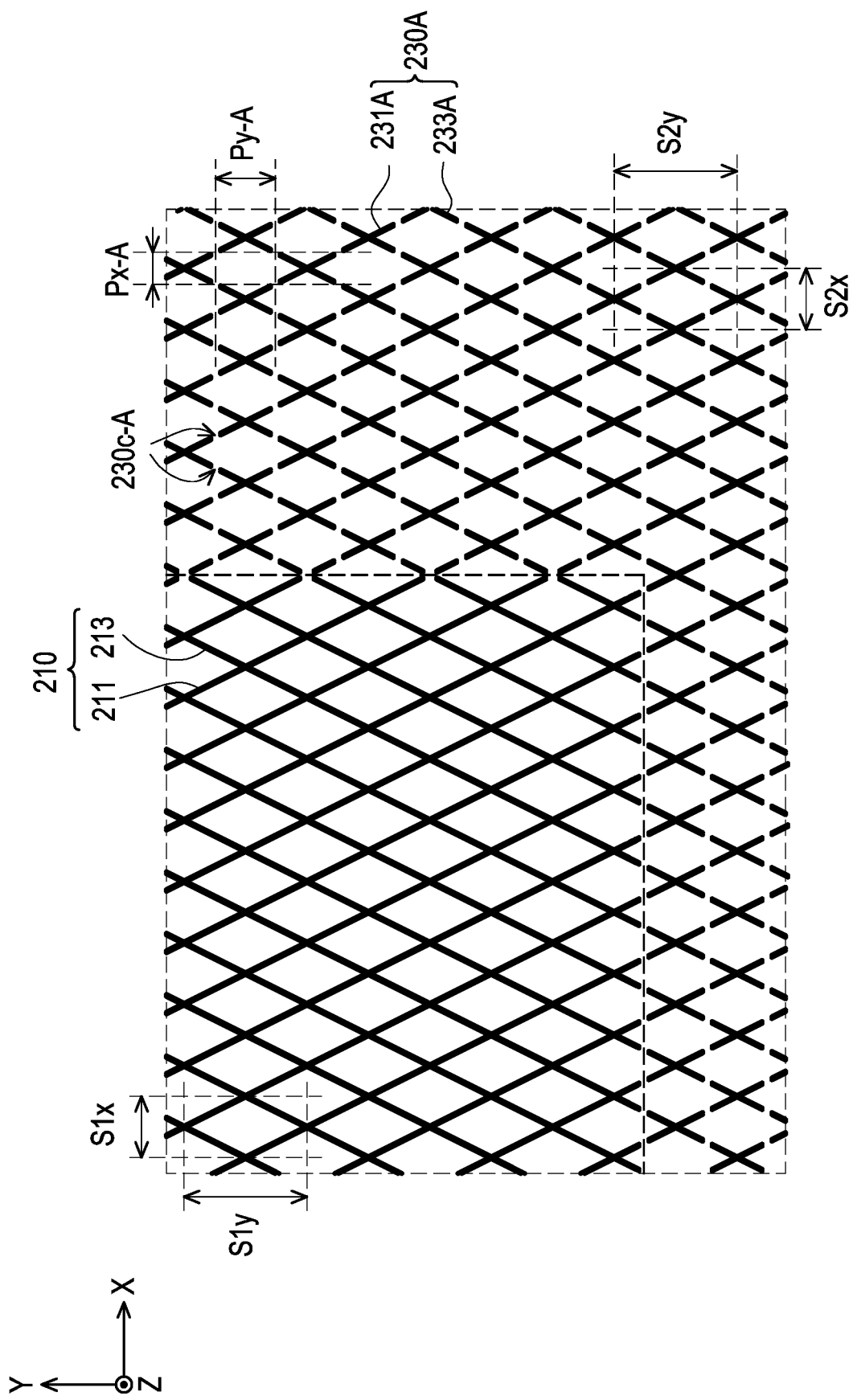
FIG. 7 is a schematic top view of antenna electrodes and a dummy electrode according to another embodiment of the disclosure.
Figure 8:
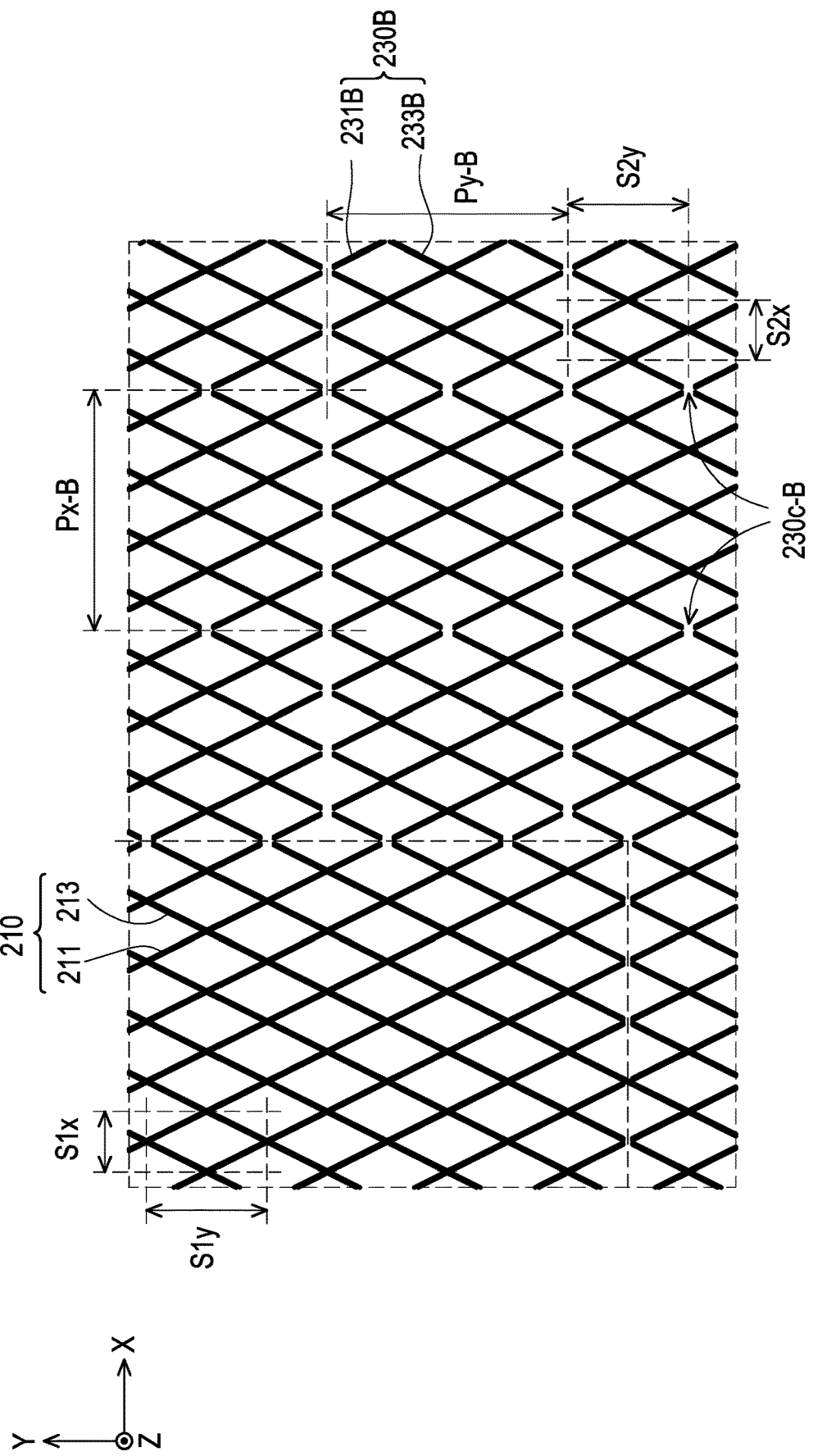
FIG. 8 is a schematic top view of antenna electrodes and a dummy electrode according to still another embodiment of the disclosure.
Figure 9:
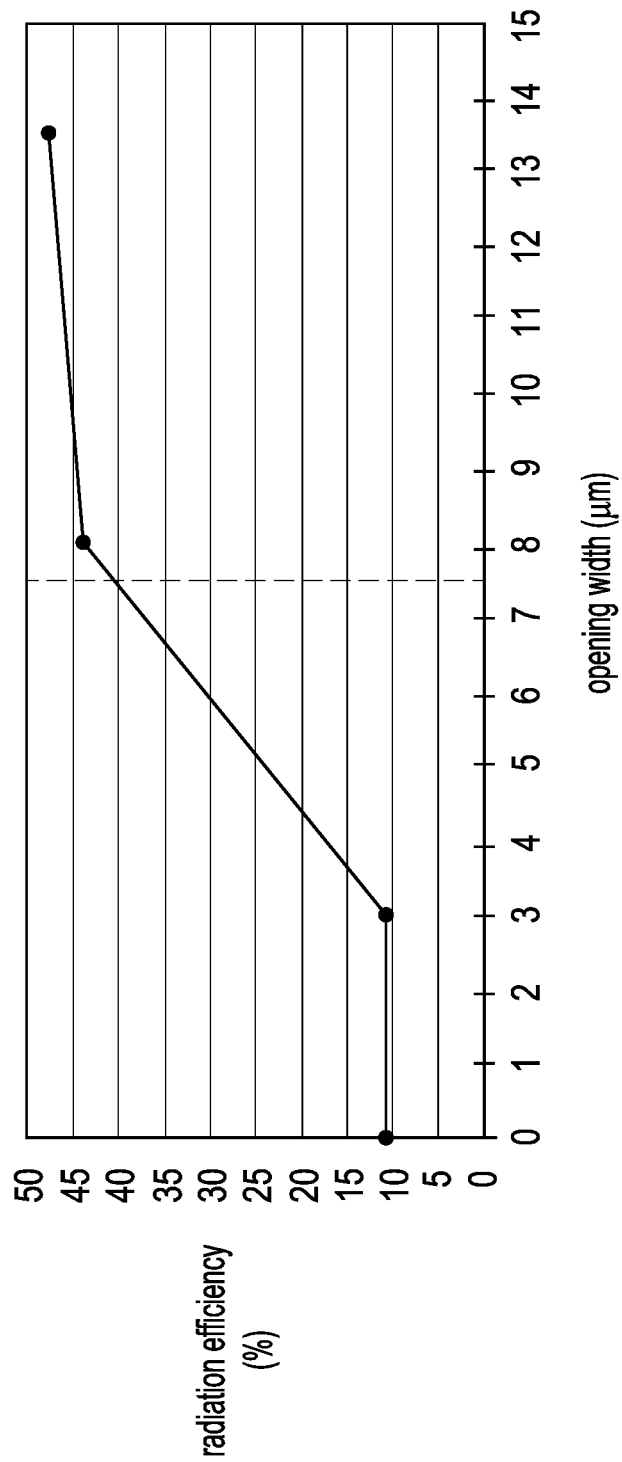
FIG. 9 is a line chart of the radiation efficiency of the antenna electrode of the disclosure to opening widths of breaks of dummy wire segments.

FIG. 1 is a schematic view of a display apparatus according to one embodiment of the disclosure. FIG. 2 is a schematic cross-sectional view of the display apparatus of FIG. 1. FIG. 3 is an enlarged top view of a partial area of the display apparatus of FIG. 1. FIG. 4 is an enlarged schematic view of antenna electrodes and a dummy electrode in a partial area I of FIG. 3. FIG. 5 is a schematic top view of a reflection layer of FIG. 2. FIG. 6 is a line chart of the radiation efficiency of the antenna electrode of the disclosure to the pitch-spacing ratio of the dummy electrode in a direction X. FIG. 7 is a schematic top view of antenna electrodes and a dummy electrode according to another embodiment of the disclosure. FIG. 8 is a schematic top view of antenna electrodes and a dummy electrode according to still another embodiment of the disclosure. FIG. 9 is a line chart of the radiation efficiency of the antenna electrode of the disclosure to opening widths of breaks of dummy wire segments. For clarity, FIG. 1 omits a backlight module BLU in FIG. 2, and FIG. 3 only illustrates a substrate 205 and a conductive layer CL of an antenna module 200 as well as a transmission line 323 and a ground electrode 325 of a circuit flexible board 320 of FIG. 1.

With reference to FIG. 1 and FIG. 2, a display apparatus 10 includes a display panel 100, the antenna module 200, and a circuit board 300. The display panel 100 has a display area DA. The antenna module 200 is disposed on the display panel 100. The circuit board 300 is disposed on the side of the display panel 100 away from the antenna module 200. In this embodiment, the display panel 100 may be a liquid crystal display panel. For example, the liquid crystal display panel includes a first substrate 101, a second substrate 102, a liquid crystal layer LCL, a pixel driving layer, and a light-shielding pattern layer BM, but the disclosure is not limited thereto. The liquid crystal layer LCL is disposed between the first substrate 101 and the second substrate 102. The pixel driving layer is disposed on the first substrate 101 and is located between the first substrate 101 and the liquid crystal layer LCL.

The pixel driving layer includes, for example, multiple data lines DL, multiple scanning lines SL, and multiple pixel structures. For example, the scanning lines SL may be arranged along the direction X and extend in a direction Y, and the data lines DL may be arranged along the direction Y and extend in the direction X, which means the data lines DL intersect the scanning lines SL and define multiple pixel areas PXA. These pixel structures are respectively disposed in correspondence to the pixel areas PXA. The pixel structures have active elements (not shown) electrically connected to each other and pixel electrodes PE. The active elements are also respectively electrically connected to one corresponding data line DL and one corresponding scanning line SL. The pixel electrodes PE are disposed in the pixel areas PXA.

To ensure electrical independence between these components, an insulation layer 110 is disposed between the scanning lines SL and the data lines DL, and an insulation layer 120 (or a flat layer) may be disposed between the data lines DL and the pixel electrodes PE. It should be noted that in other embodiments, the numbers of insulation layers and flat layers included in the pixel driving layer may be adjusted according to the actual circuit design, and the disclosure is not limited to the content disclosed in the drawings.

The light-shielding pattern layer BM is disposed in correspondence to the data lines DL and the scanning lines SL, which means the light-shielding pattern layer BM may also define the aforementioned pixel areas PXA. In this embodiment, the second substrate 102 is further disposed with a color filter layer 130. The color filter layer 130 includes, for example, multiple color filter patterns (not shown) disposed in correspondence to the pixel areas PXA, and these color filter patterns are adapted to allow light of different colors to pass through to achieve the effect of color display.

Since the display panel 100 of the embodiment is a non-self-luminous display panel, the backlight module BLU is also disposed between the display panel 100 and the circuit board 300. This backlight module BLU is configured to provide multiple illumination beams. Since the backlight module BLU of this embodiment may be a backlight module in any form well known to those skilled in the display technology field, the relevant details are not described herein.

In order to allow the pixel structures in each pixel area PXA to respectively control the intensity of light after the illumination beams pass through the display panel 100 to achieve the display effect, the display panel 100 further includes two polarizing plates POL1 and POL2 respectively disposed on the first substrate 101 and the second substrate 102, and the axial directions of the penetration shafts of the two polarizing plates POL1 and POL2 may be configured according to the operation mode of the liquid crystal layer LCL.

It should be noted that the disclosure does not limit the types of the liquid crystal display panel. For example, the display panel 100 of this embodiment may be a vertical alignment (VA) liquid crystal display panel, an in-plane switching (IPS) liquid crystal display panel, a multidomain vertical alignment (MVA) liquid crystal display panel, a twisted nematic (TN) liquid crystal display panel, a super twisted nematic (STN) liquid crystal display panel, a patterned vertical alignment (PVA) liquid crystal display panel, a fringe field switching (FFS) liquid crystal display panel, or an optically compensated birefringence (OCB) liquid crystal display panel, but the disclosure is not limited thereto.

Furthermore, the antenna module 200 includes a substrate 205, an antenna electrode 210, a feed line 215, a ground electrode 220, and a dummy electrode 230. The antenna electrode 210, the feed line 215, the ground electrode 220, and the dummy electrode 230 belong to the conductive layer CL, and the conductive layer CL is disposed on a lateral surface of the substrate 205 away from the display panel 100. The material of the substrate 205 includes, for example, glass or a light-transmitting polymer material (such as polymethyl methacrylate (PMMA), polycarbonate (PC), or polyimide (PI)). In this embodiment, the antenna module 200 may include multiple antenna electrodes 210 and multiple feed lines 215, and these antenna electrodes 210 may be arranged in an antenna array, such as being arranged in a one-dimensional antenna array along the direction X.

It should be noted that if each antenna electrode 210 is used with a phase shifter, the antenna array may adjust the direction of electromagnetic waves in transmission or reception function on the XZ plane, but the disclosure is not limited thereto. In another embodiment not shown, the antenna electrodes 210 disposed in the display area DA may also be respectively arranged in multiple columns and multiple rows along the direction X and the direction Y to form a two-dimensional antenna array. The two-dimensional antenna array may adjust the direction of electromagnetic waves in transmission or reception function on the XZ plane and/or the YZ plane.

In this embodiment, the feeding lines 215 extend into the display area DA from a side edge area (i.e., a peripheral area PA) of the substrate 205 and respectively electrically connect the antenna electrodes 210. The ground electrode 220 is disposed between the feed lines 215. For example, the feeding lines 215 and the ground electrode 220 may form a coplanar waveguide and serve as a transmission structure for electromagnetic wave signals.

On the other hand, the antenna module 200 may transmit electromagnetic waves of the receiving signals to the circuit board 300 or receive the electromagnetic waves of the transmitting signals from the circuit board 300 through the circuit flexible board 320, and the circuit board 300 is disposed with, for example, multiple control chips 315 of radio frequency (RF) antennas. With reference to FIG. 3 together, the circuit flexible board 320 may include a flexible substrate 321, multiple transmission lines 323, and the ground electrode 325. For example, the circuit flexible board 320 may be bonded to the side edge area of the substrate 205 of the antenna module 200 where the feed lines 215 are disposed for the transmission lines 323 to be respectively electrically connected to the feed lines 215 and for the ground electrode 325 to be electrically connected to the ground electrode 220 on the substrate 205, but the disclosure is not limited thereto.

In order to reduce the visibility of the antenna electrodes 210 in the display area DA, the dummy electrode 230 overlapping the display area DA along a direction Z is disposed around the antenna electrodes 210 and is electrically separated from the antenna electrodes 210. More specifically, the areas in the display area DA of the display panel 100 without the antenna electrodes 210 are disposed with the dummy electrode 230 to increase the concealment of the antenna electrodes 210. In order to increase the radiation efficiency of the antenna electrodes 210, the dummy electrode 230 may have a floating potential, which means the dummy electrode 230 is electrically independent of any power supply or any conductor at a fixed potential.

With reference to FIG. 4 together, the antenna electrode 210 has multiple wire segments 211 and multiple wire segments 213 intersecting each other and forming multiple meshes. In other words, the antenna electrode 210 is a mesh electrode structure. Similarly, the dummy electrode 230 is substantially a mesh electrode structure as well, such as being formed by multiple dummy wire segments 231 and multiple dummy wire segments 233 whose extension directions intersect each other. It should be noted that unlike the antenna electrode 210, the dummy wire segments of the dummy electrode 230 may have multiple breaks 230c to reduce the electrical coupling effect between the antenna electrode 210 and the dummy electrode 230, so as to further enhance the electromagnetic wave radiation efficiency of the antenna electrode 210.

In detail, the wire segments 211 or the wire segments 213 of the antenna electrode 210 are arranged along the direction X, with their extension directions intersecting each other in the direction X and the direction Y. Every two adjacent wire segments 211 or wire segments 213 have a spacing $S1x$ in the direction X (i.e., the width of the mesh in the direction X) and have a spacing $S1y$ in the direction Y (i.e., the width of the mesh in the direction Y). Similarly, the dummy wire segments 231 or the dummy wire segments 233 of the dummy electrode 230 are arranged along the direction X, with their extension directions intersecting each other in the direction X and the direction Y. Every two adjacent dummy wire segments 231 or dummy wire segments 233 have a spacing S2x in the direction X and have a spacing S2y in the direction Y.

For example, in this embodiment, the spacing S1x of the wire segments 211 (or the wire segments 213) of the antenna electrode 210 in the direction X may be selectively equal to the spacing S2x of the dummy wire segments 231 (or the dummy wire segments 233) of the dummy electrode 230 in the direction X, and the spacing S1y of the wire segments 211 (or the wire segments 213) of the antenna electrode 210 in the direction Y may be selectively equal to the spacing S2y of the dummy wire segments 231 (or the dummy wire segment 233) of the dummy electrode 230 in the direction Y, but the disclosure is not limited thereto. On the other hand, in this embodiment, a linewidth LW1 of the wire segments of the antenna electrode 210 may also be selectively equal to a linewidth LW2 of the dummy wire segments of the dummy electrode 230, but the disclosure is not limited thereto.

It should be noted that the break 230c of the dummy electrode 230 of this embodiment is disposed at the intersection between the extension direction of the dummy wire segment 231 and the extension direction of the dummy wire segment 233. In detail, every two adjacent breaks 230c arranged along the direction X have a pitch Px, and every two adjacent breaks 230c arranged along the direction Y have a pitch Py. In order to obtain better electromagnetic wave radiation efficiency, the ratio of the pitch Px to the spacing S2x may be less than or equal to 1.25, and the ratio of the pitch Py to the spacing S2y may be less than or equal to 1.25. For example, in this embodiment, the ratio of the pitch Px to the spacing S2x is equal to 1, and the ratio of the pitch Py to the spacing S2y is equal to 1. In this way, the radiation efficiency of the antenna module 200 of this embodiment may reach more than 40% (as shown in FIG. 6).

With reference to FIG. 7, in another embodiment, multiple breaks 230c-A of a dummy electrode 230A are disposed away from the multiple intersections of multiple dummy wire segments 231A and multiple dummy wire segments 233A. More specifically, for these breaks 230c-A, the ratio of a pitch Px-A in the direction X to the spacing S2x is 0.5, and the ratio of a pitch Py-A in the direction Y to the spacing S2y is 0.5. In this way, compared with the dummy electrode 230 of FIG. 4, the dummy electrode 230A of FIG. 7 may further increase the electromagnetic wave radiation efficiency of the antenna module to reach more than 45% (as shown in FIG. 6).

With reference to FIG. 8, in another embodiment, although multiple breaks 230c-B of a dummy electrode 230B are disposed at multiple intersections of multiple dummy wire segments 231B and multiple dummy wire segments 233B like the breaks 230c of FIG. 4, the overall number of the breaks 230c-B is relatively small. More specifically, in the embodiment of FIG. 8, the dummy electrode 230B has multiple break areas respectively extending in the direction X and the direction Y and intersecting each other, and the breaks 230c-B are disposed in these break areas. The ratio of a pitch Px-B of the break areas extending in the direction Y and arranged along the direction X to the spacing S2x is 4, and the ratio of a pitch Py-B of the break areas extending in the direction X and arranged along the direction Y to the spacing S2y is 2. As shown in FIG. 6, the effect of improving the radiation efficiency of the antenna electrode 210 by the dummy electrode 230B of FIG. 8 is less than that of the dummy electrode 230 of FIG. 4 and the dummy electrode 230A of FIG. 7.

From another point of view, since the dummy electrode is disposed with the breaks, the distance between the dummy electrode and the antenna electrodes may be reduced, which may further reduce the visibility of the antenna electrodes 210 in the display area DA, and may also ensure the electromagnetic wave radiation efficiency of the antenna electrodes.

With reference to FIG. 4 and FIG. 9, on the other hand, the break 230c of the dummy electrode 230 has an opening width W in the direction Y. Preferably, the opening width W is greater than or equal to 7.5 micrometers and less than or equal to 25 micrometers. When the opening width W is less than 7.5 micrometers, the radiation efficiency of the antenna electrode 210 is lower than 40%. For example, when the opening width W is 3 micrometers, the radiation efficiency is even lower than 12%. When the opening width W is greater than 25 micrometers, the visibility of the breaks in the display area is significantly increased.

According to FIG. 6 and FIG. 9, the relatively dense distribution of the breaks of the dummy electrode or the greater opening width of the breaks may improve the radiation efficiency of the antenna electrode.

With reference to FIG. 2 and FIG. 5, in order to adjust the radiation field type of electromagnetic waves to improve the utilization efficiency of radiation power, the antenna module 200 is further disposed with a reflection layer 250 on a lateral surface of the substrate 205 away from the antenna electrodes 210, and the reflection layer 250 overlaps the antenna electrodes 210 along the direction Z. Since the reflection layer 250 is disposed to reflect electromagnetic waves, a thickness T thereof along the direction Z is greater than $$\sqrt{\frac{1}{\pi f \mu_r \mu_0 \sigma}},$$

where f is the minimum frequency in the electromagnetic wave operating frequency band of the antenna module 200, $\mu_r$ is the relative permeability of the reflection layer 250, $\mu_0$ is the vacuum permeability, and $\sigma$ is the conductivity of the reflection layer 250. For example, in this embodiment, the reflection layer 250 may be made of a metal material, such as copper or other metals with suitable conductivity.

Since the reflection layer 250 is disposed in the display area DA in correspondence to the antenna electrodes 210, the reflection layer 250 may also have a mesh configuration to reduce the optical transmittance loss of the display panel 100. In other words, the reflection layer 250 may have multiple wire segments 251 and multiple wire segments 253, and the wire segments 251 intersect the wire segments 253 and define multiple meshes. In this embodiment, the reflection layer 250 may have a ground potential.

Other embodiments are described below to explain the disclosure in detail, and the same components will be denoted by the same reference numerals, and the description of the same technical content will be omitted. For the description of the omitted part, reference may be made to the above embodiment, and details are not described in the following embodiments.

Figure 10:
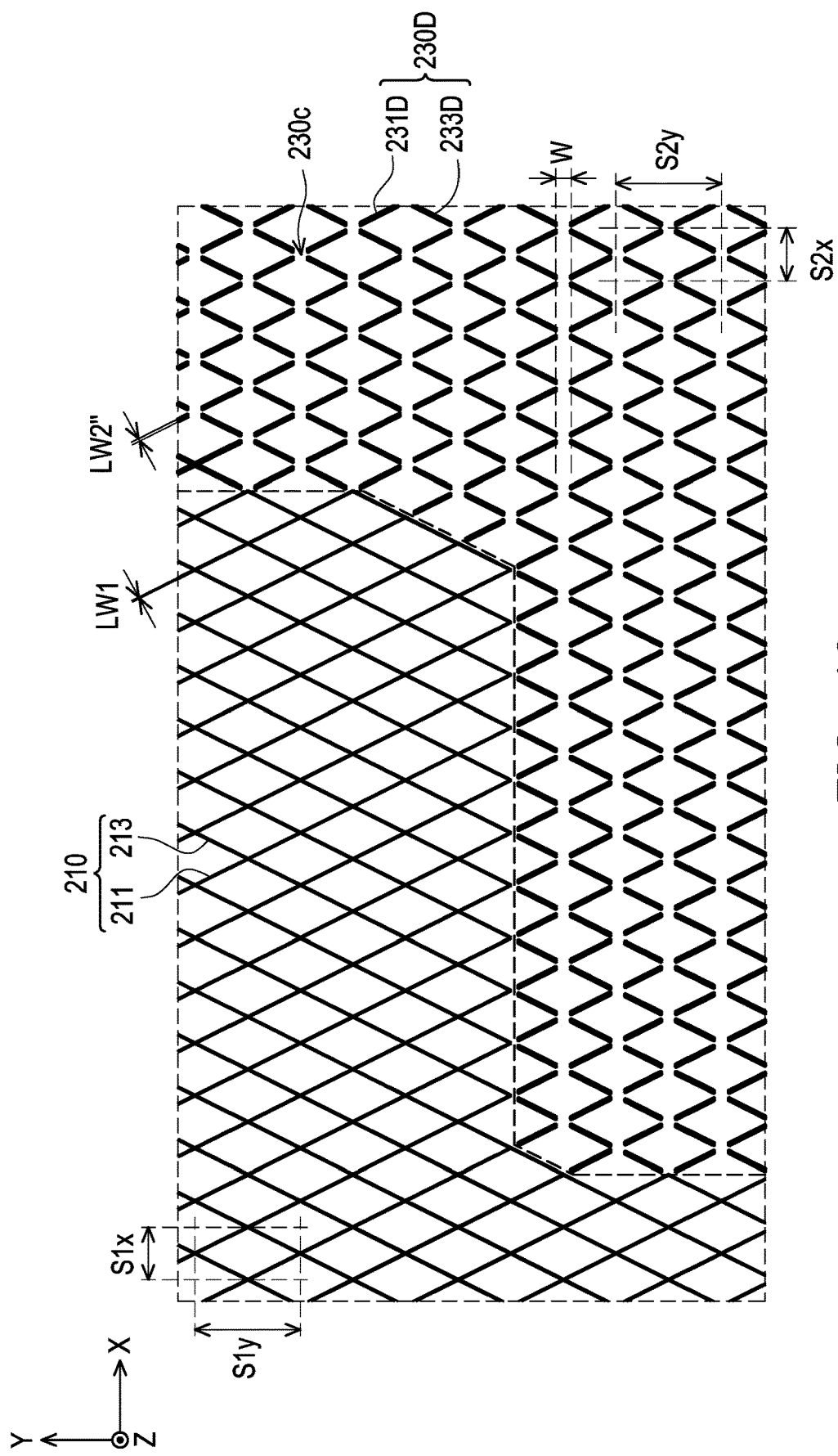
FIG. 10 is a schematic top view of antenna electrodes and a dummy electrode according to still another embodiment of the disclosure.

FIG. 10 is a schematic top view of antenna electrodes and a dummy electrode according to still another embodiment of the disclosure. With reference to FIG. 10, a dummy electrode 230D of this embodiment and the dummy electrode 230 of FIG. 4 are different in the linewidth of the dummy wire segments. Specifically, in this embodiment, a linewidth LW2" of the dummy wire segments 231D and the dummy wire segments 233D of the dummy electrode 230D may be greater than the linewidth LW1 of the wire segments of the antenna electrode 210.

Since the spacing S1x of the wire segments 211 (or the wire segments 213) of the antenna electrode 210 in the direction X is equal to the spacing S2x of the dummy wire segments 231D (or the dummy wire segments 233D) of the dummy electrode 230D in the direction X, and the spacing S1y of the wire segments 211 (or the wire segments 213) of the antenna electrode 210 in the direction Y is equal to the spacing S2y of the dummy wire segments 231D (or the dummy wire segments 233D) of the dummy electrode 230D in the direction Y, then the breaks 230c disposed with the dummy electrode 230D cause a substantial difference in brightness after light passes through the dummy electrode 230D and the antenna electrode 210, resulting in an increase in the visibility of the antenna electrode (or the dummy electrode) and a decrease in display quality.

Therefore, increasing the linewidth LW2" of the dummy wire segments of the dummy electrode 230D may compensate the change in transmittance of the dummy electrode 230D due to the breaks 230c, so that the difference in transmittance of light between the antenna electrode 210 and the dummy electrode 230D may be increased, and the concealment of the antenna electrode 210 may thus be improved. For example, when the mesh widths of the antenna electrode 210 in the direction X and the direction Y (i.e., the spacing S1x and the spacing Sly) are 120 micrometers and 240 micrometers respectively, if the opening width W of the break 230c is increased from 10 micrometers to 20 micrometers, then increasing the linewidth LW2" of the dummy wire segment from 3.5 micrometers to 4.08 micrometers may maintain the concealment of the antenna electrode 210.

However, the disclosure is not limited to the above. In other embodiments, if the opening width of the dummy electrode increases, adjusting the arrangement spacing of the wire segment of the antenna electrode (i.e., the width of the mesh in the direction X or the direction Y) may compensate the change in transmittance of the dummy electrode due to the increase in the opening width of the breaks. In other words, the arrangement spacing of the wire segments of the antenna electrode in a direction may be different from the arrangement spacing of the dummy wire segments of the dummy electrode in the same direction. For example, if the opening width W of the break portion 230c in FIG. 10 is increased from 10 micrometers to 20 micrometers, increasing the spacing S1x of the wire segment of the antenna electrode 210 from 120.21 micrometers to 120.85 micrometers may also maintain the concealment of the antenna electrode 210.

Figure 11:
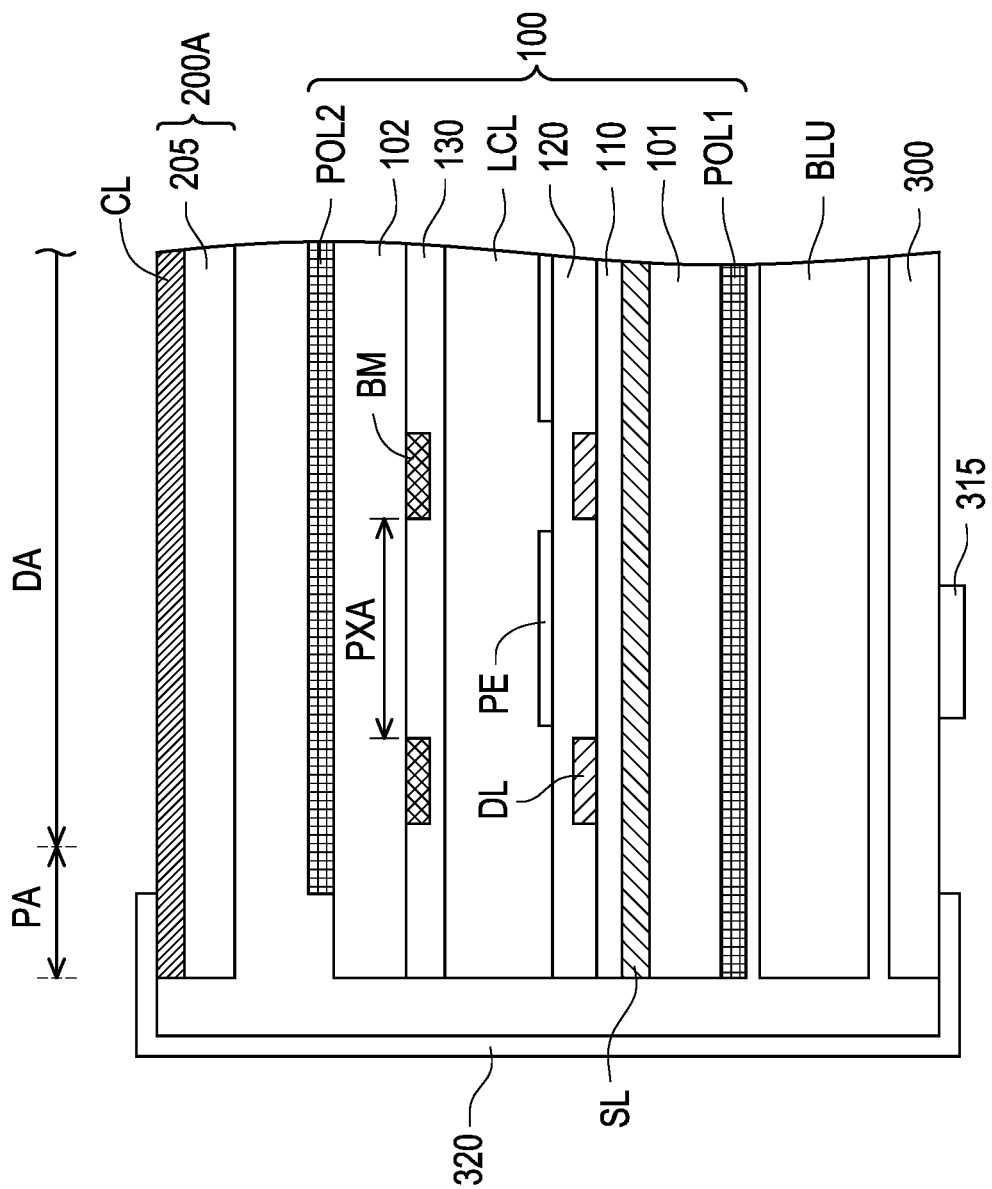
FIG. 11 is a schematic cross-sectional view of a display apparatus according to another embodiment of the disclosure.
Figure 12:
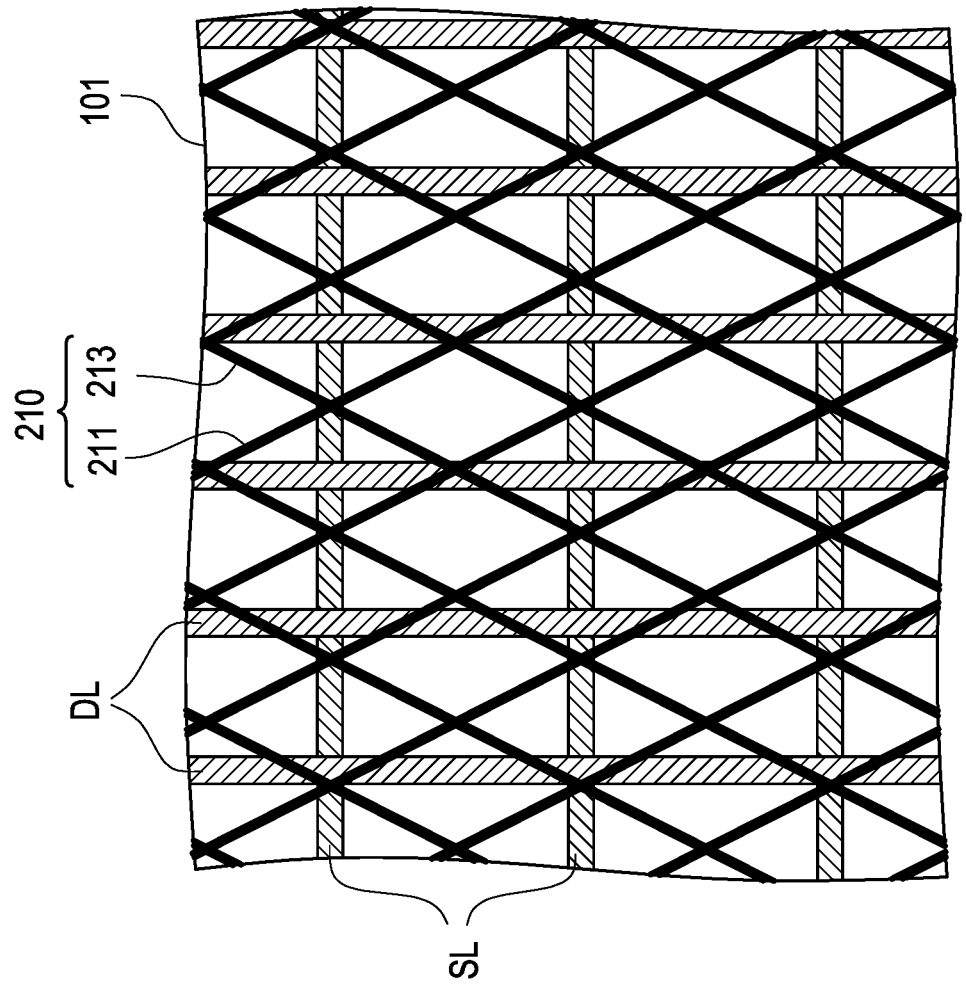
FIG. 12 is a schematic top view of the display apparatus of FIG. 11.

FIG. 11 is a schematic cross-sectional view of a display apparatus according to another embodiment of the disclosure. FIG. 12 is a schematic top view of the display apparatus of FIG. 11. With reference to FIG. 11 and FIG. 12, a display device 20 of this embodiment and the display device 10 of FIG. 2 is different in that an antenna module 200A of the display device 20 is disposed with, instead of the reflection layer 250 of FIG. 2, a metal mesh structure formed by the data lines DL and the scanning lines SL in the display panel 100 as a reflection layer for electromagnetic waves.

It should be noted that since the reflection layer of this embodiment is disposed in the display panel 100, each layer in the display panel 100 between the data lines DL (or the scanning lines SL) and the antenna module 200A (e.g., the polarizing plate POL2, the second substrate 102, the color filter layer 130, the insulation layer, and the liquid crystal layer LCL) are required to have the designed effective dielectric constant and dielectric loss so as to reduce the energy loss of electromagnetic waves passing through these layers.

In summary, in the display device of an embodiment of the disclosure, the dummy electrode disposed around the antenna electrodes has the dummy wire segments intersecting each other and at least partially disconnected. Therefore, the electrical coupling effect between the antenna electrodes and the dummy electrode may be effectively reduced, thereby improving the electromagnetic wave radiation efficiency of the antenna electrodes. In the antenna module of an embodiment of the disclosure, the visibility of the antenna electrodes may be effectively reduced by having different linewidths or arrangement spacings of the dummy wire segments of the dummy electrode and the wire segments of the antenna electrodes.

What is claimed is:

1. A display apparatus, comprising:
   a display panel, having a display area;
   a plurality of antenna electrodes, disposed on the display panel and overlapping the display area;
   a dummy electrode, disposed around the antenna electrodes and overlapping the display area, the dummy electrode being electrically separated from the antenna electrodes and having a plurality of dummy wire segments whose extension directions intersect each other, and the dummy wire segments having a plurality of breaks; and
   a plurality of feed lines, respectively electrically connected to the antenna electrodes, wherein an opening width of each of the breaks is greater than or equal to 7.5 micrometers and less than or equal to 25 micrometers.

2. The display apparatus according to claim 1, further comprising:
   a reflection layer, disposed on a side of the antenna electrodes facing the display panel and overlapping the antenna electrodes.

3. The display apparatus according to claim 2, wherein the display panel has a plurality of data lines and a plurality of scanning lines, and serves as the reflection layer, with the data lines intersecting the scanning lines.

4. The display apparatus according to claim 2, wherein the reflection layer is located between the antenna electrodes and the display panel, and has a plurality of metal wire segments intersecting each other.

5. The display apparatus according to claim 1, wherein the dummy electrode has a floating potential.

6. The display apparatus according to claim 1, wherein every two adjacent ones of the dummy wire segments arranged along a first direction and parallel to each other have a spacing, every two adjacent ones of the breaks arranged along the first direction have a pitch, and a ratio of the pitch to the spacing is less than or equal to 1.25.

7. A display apparatus comprising:
   a display panel, having a display area;
   a plurality of antenna electrodes, disposed on the display panel and overlapping the display area;
   a dummy electrode, disposed around the antenna electrodes and overlapping the display area, the dummy electrode being electrically separated from the antenna electrodes and having a plurality of dummy wire segments whose extension directions intersect each other, and the dummy wire segments having a plurality of breaks;

a plurality of feed lines, respectively electrically connected to the antenna electrodes; and a reflection layer, disposed on a side of the antenna electrodes facing the display panel and overlapping the antenna electrodes, wherein the reflection layer is adapted to reflect an electromagnetic wave having a frequency f, and a thickness of the reflection layer is greater than $$\sqrt{\frac{1}{\pi f \mu_r \mu_0 \sigma}},$$

wherein $\mu_r$ is relative permeability of the reflection layer, $\mu_0$ is vacuum permeability, and $\sigma$ is conductivity of the reflection layer.

8. The display apparatus according to claim 1, wherein each of the antenna electrodes has a plurality of wire segments intersecting each other, each of the wire segments has a first linewidth, each of the dummy wire segments has a second linewidth, and the first linewidth is different from the second linewidth.

9. The display apparatus according to claim 1, wherein each of the antenna electrodes has a plurality of wire segments intersecting each other, every two adjacent ones of the wire segments arranged along a first direction and parallel to each other have a first spacing, every two adjacent ones of the dummy wire segments arranged along the first direction and parallel to each other have a second spacing, and the first spacing is different from the second spacing.

10. The display apparatus according to claim 7, wherein an opening width of each of the breaks is greater than or equal to 7.5 micrometers and less than or equal to 25 micrometers.

11. The display apparatus according to claim 7, wherein the display panel has a plurality of data lines and a plurality of scanning lines, and serves as the reflection layer, with the data lines intersecting the scanning lines.

12. The display apparatus according to claim 7, wherein the reflection layer is located between the antenna electrodes and the display panel, and has a plurality of metal wire segments intersecting each other.

13. The display apparatus according to claim 7, wherein each of the antenna electrodes has a plurality of wire segments intersecting each other, each of the wire segments has a first linewidth, each of the dummy wire segments has a second linewidth, and the first linewidth is different from the second linewidth.

14. The display apparatus according to claim 7, wherein each of the antenna electrodes has a plurality of wire segments intersecting each other, every two adjacent ones of the wire segments arranged along a first direction and parallel to each other have a first spacing, every two adjacent ones of the dummy wire segments arranged along the first direction and parallel to each other have a second spacing, and the first spacing is different from the second spacing.

15. An antenna module, comprising:

a substrate;

a plurality of antenna electrodes, arranged on the substrate and each having a plurality of wire segments intersecting each other, every two adjacent ones of the wire segments arranged along a first direction and parallel to each other having a first spacing, and each of the wire segments having a first linewidth;

a plurality of feed lines, respectively electrically connected to the antenna electrodes; and a dummy electrode, disposed around the antenna electrodes and electrically separated from the antenna electrodes, the dummy electrode having a plurality of dummy wire segments whose extension directions intersect each other, every two adjacent ones of the dummy wire segments arranged along the first direction and parallel to each other having a second spacing, each of the dummy wire segments having a second linewidth, wherein the first spacing is different from the second spacing or the first linewidth is different from the second linewidth, the dummy wire segments have a plurality of breaks, and an opening width of each of the breaks is greater than or equal to 7.5 micrometers and less than or equal to 25 micrometers.

16. The antenna module according to claim 15, wherein every two adjacent ones of the dummy wire segments arranged along the first direction and parallel to each other have a spacing, every two adjacent ones of the breaks arranged along the first direction have a pitch, and a ratio of the pitch to the spacing is less than or equal to 1.25.

17. The antenna module according to claim 15, wherein the dummy electrode has a floating potential.

18. The antenna module according to claim 15, further comprising:

a reflection layer, disposed on a side of the substrate away from the antenna electrodes and overlapping the antenna electrodes.

* * * * *